April 18, 1933.　　　J. R. AMBROSIUS　　　1,904,114
LUGGAGE CARRIER FOR MOTOR VEHICLES
Filed April 4, 1932
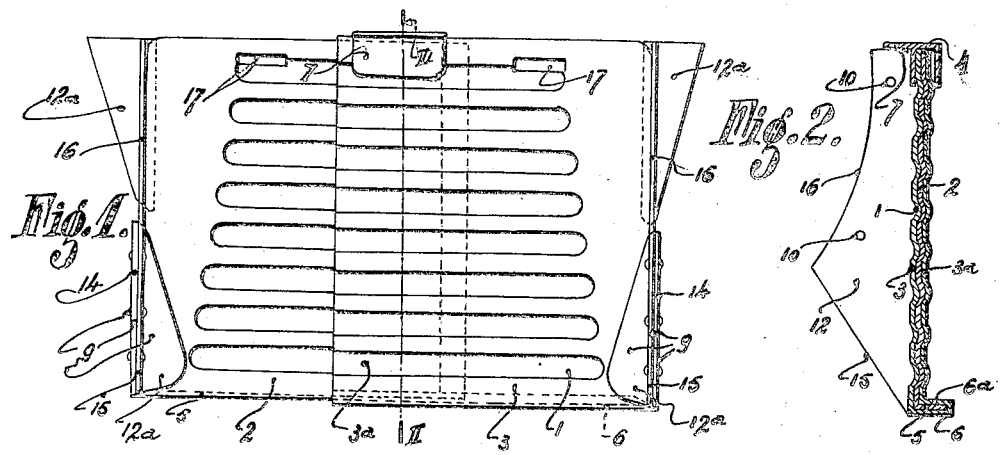
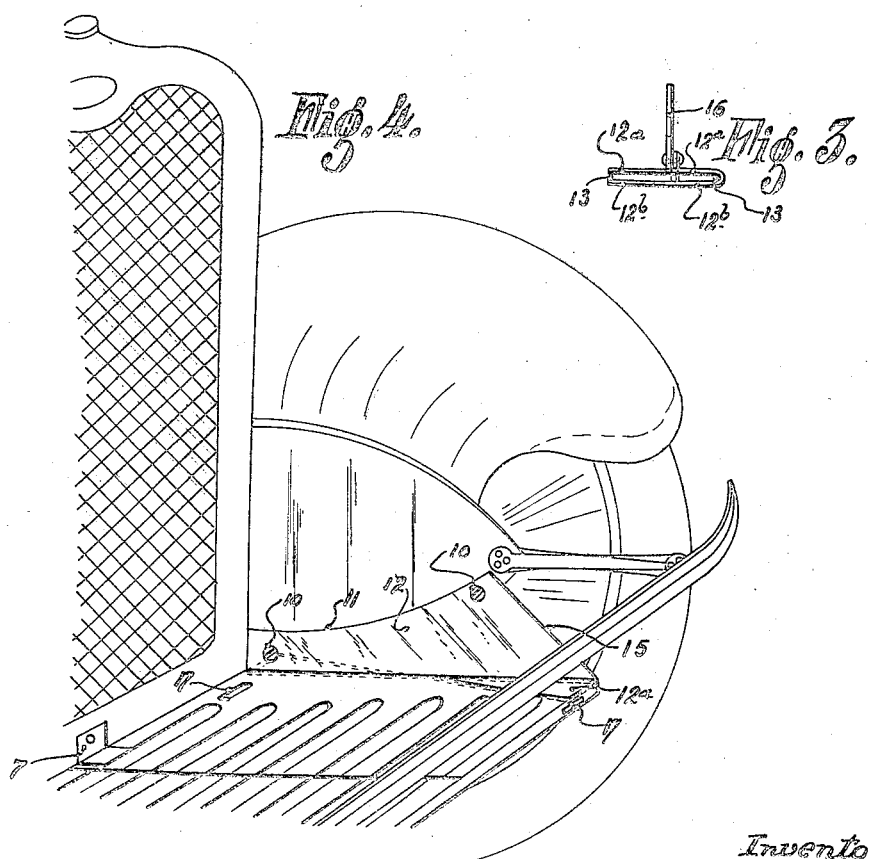
Inventor
J. R. Ambrosius
by Wilkinson & Mawhinney
Attorneys.

Patented Apr. 18, 1933

1,904,114

UNITED STATES PATENT OFFICE

JULIUS RICHARD AMBROSIUS, OF MEXICO, MEXICO

LUGGAGE CARRIER FOR MOTOR VEHICLES

Application filed April 4, 1932, Serial No. 603,111, and in France May 9, 1931.

The present invention has reference to a luggage carrier for automobile vehicles and is intended to supplement the usual luggage carrier placed at the rear of the vehicle.

One object of the present invention is to provide a handy compact luggage carrier which may be located in front of the vehicle between the front springs and the width of which is adjustable so that said carrier may be adapted to different makes of cars.

Another object of the invention is to make the luggage carrier easily removable in case it should be necessary to crank up the engine owing to the self-starter failing to operate.

With these and other objects in view, the invention is characterized by the arrangement and combination of parts as recited in the accompanying claims and described more particularly in the ensuing description taken in conjunction with the accompanying drawing wherein:

Fig. 1 is a plan view of the luggage carrier in accordance with the invention.

Fig. 2 is a sectional elevation thereof on the line II—II Fig. 1.

Fig. 3 is an end view of one of the guiding brackets of the luggage carrier, and Fig. 4 is a perspective view of the luggage carrier mounted in front of the car.

In the drawing, the luggage carrier which has been comprehensively designated 1, comprises two corrugated sheet metal plates 2 and 3 adapted to telescope one over the other in a manner presently to be described.

Over a predetermined length thereof, the plate 3 includes an additional portion which is bent back twice at right angles to form a strip 3ª extending across the plate 3 with a certain clearance 4 between it and said plate 3, into which can fit the plate 2, its corrugations resting in those of the plate 3 and strip 3ª. The front sides of the plates 2 and 3 are bent down at right angles to form depending ledges 5 and 6, the strip 3ª having a corresponding bent portion 6ª which may be soldered to or otherwise suitably secured to be the ledge 6 of the plate 3.

The rear side of the luggage carrier may be supported in a bracket 7 riveted to or otherwise secured to the bottom of the radiator or its casing.

In order to support the luggage carrier along its short sides, brackets 9 are provided which are secured by means of bolts 10 to the internal side cheeks 11 fixed to the chassis longitudinals and masking the front springs (not shown).

The brackets 9 are each formed by an upstanding plate 12 the bottom edge of which is bent over at right angles half in one direction, half in the opposite, the flanges 12ª thus formed being cut to substantially triangular form as shown in Fig. 1. Below each of said triangular flanges is located a second correspondingly shaped flange 12ᵇ, the associated flanges defining between them channels or guide-ways 13 adapted to receive the short sides of the plates 2 and 3. One of said lower flanges may be integral with the plate 12 and formed by bending the plate back again while the other flange may form the base of a piece of angle iron 14 riveted to or otherwise suitably secured to the plate 12. The top edge of each plate 12 comprises a straight sloping portion 15 rising to a point from which drops a curved portion 16 conforming to the shape of the lower edge of the side cheek 11 to which it is secured by the aforesaid bolts 10.

Due to the special form of the guide-ways 13, the upright side plates 12 may be set at any angle to the plates 2, 3 to adapt themselves to the differences in width between the rear and front part of the side cheeks 11 obtaining in different makes of cars, the flanges 12ª and 12ᵇ always forming a bearing surface for the short sides of the plates 2, 3.

It will be readily understood that with this arrangement the luggage carrier 1 may be easily removed and put back by simply pulling it out of and slipping it back into the channels 13.

Openings 17 are formed in the plates 2 and 3 at the rear and front thereof, through which straps (not shown) may be passed to lash the luggage to the carrier.

It will also be understood that the width of the luggage carrier 1 may be adapted to the space between the internal side cheeks 11 by causing the plate 2 to telescope more or less within the plate 3.

I claim:

1. The combination with a motor vehicle, including front springs, of a luggage carrier comprising two plates of corrugated sheet metal, one of said plates including an additional strip bent over twice at right angles to form with said plate a housing into and out of which the second plate may slide to vary the width of said carrier.

2. The combination with a motor vehicle, front springs therefor and internal side cheeks with curved lower edges masking said front springs, of a luggage carrier mounted between said side cheeks, and means secured to said side cheeks for supporting said luggage carrier, and supporting brackets for said carrier, comprising upright plates with curved top edges conforming to the shape of said side cheeks and secured thereto and horizontal channel members adapted to receive the sides of said luggage carrier for different angular settings of said upright plates with respect to said luggage carrier.

3. The combination with a motor vehicle, front springs therefor and internal side cheeks with curved lower edges masking said front springs, of a luggage carrier comprising two plates of corrugated sheet metal, one of said plates including an additional strip bent over twice at right angles to form with said plate a housing into and out of which the second plate may slide to vary the width of said carrier, and supporting brackets for said carrier, comprising upright plates with curved top edges conforming to the shape of said side cheeks and secured thereto and horizontal channel members adapted to receive the sides of said luggage carrier.

JULIUS RICHARD AMBROSIUS.